United States Patent [19]

Wang

[11] Patent Number: 5,142,947
[45] Date of Patent: Sep. 1, 1992

[54] ADJUSTABLE MOTOR-OPERATED CIRCULAR SAW SHARPENER

[76] Inventor: Tian-Wang Wang, No. 45, Yi Chang Tung Road, Tai Ping Hsiang, Taichung Hsien, Taiwan

[21] Appl. No.: 737,644

[22] Filed: Jul. 30, 1991

[51] Int. Cl.⁵ .............................................. B23D 63/14
[52] U.S. Cl. .......................................... 76/42; 76/37; 51/225; 51/216 ND
[58] Field of Search ............... 51/72 R, 218 T, 225, 51/216 ND, 216 H, 91 BS, 92 BS, 98 BS, 98 SP; 76/37, 42, 40, 77

[56] References Cited

U.S. PATENT DOCUMENTS

| | | | |
|---|---|---|---|
| 2,534,470 | 12/1950 | Murphy | 76/37 |
| 3,766,806 | 10/1973 | Benner | 51/225 |
| 3,952,616 | 4/1976 | Varley | 51/216 ND |
| 4,528,778 | 7/1985 | Wolff | 51/92 BS |

FOREIGN PATENT DOCUMENTS

| | | | |
|---|---|---|---|
| 0746634 | 6/1933 | France | 76/42 |
| 0293503 | 12/1953 | Switzerland | 76/42 |

Primary Examiner—Robert A. Rose
Attorney, Agent, or Firm—Bacon & Thomas

[57] ABSTRACT

A circular saw sharpener comprising a base mounted on a work table at the top, a bracket pivoted thereto at the top which bracket has a L-shaped frame pivoted thereto at the top for holding a motor and a grinding wheel, a guide arrangement mounted on said bracket at the bottom for guiding the circular saw blade to be sharpened, a feed mechanism mounted on said base and controlled by a hand lever to carry the circular saw blade to be sharpened toward said grinding wheel for grinding. The level position of the circular saw blade to be sharpened can be adjusted by an adjusting knob. The angular position of the sand wheel can be adjusted by a lock screw, to fit the inclination of the teeth on the circular saw blade to be sharpened.

1 Claim, 4 Drawing Sheets

ADJUSTABLE MOTOR-OPERATED CIRCULAR SAW SHARPENER

BACKGROUND OF THE INVENTION

The present invention relates to circular saw sharpeners and relates more particularly to a motor-operated circular saw sharpener which can be conveniently adjusted to efficiently sharpen the teeth of circular saw blades.

The saw blade of a sawing machine must be regularly sharpened so that it can be controlled to operate a saw or saws efficiently. Conventionally, a simple hand tool is used for sharpening the teeth of circular saw blades. However, sharpening a circular saw blade by the hand requires special technique. Only a skilled person can efficiently manipulate a saw blade sharpening tool to sharpen the teeth of circular saw blades. There are several models of circular saw sharpening machines disclosed for sharpening circular saw blades. However, conventional circular saw sharpening machines are generally heavy, expensive, and difficult to maintain and operate.

SUMMARY OF THE INVENTION

The present invention has been accomplished under the circumstances in view. It is therefore an object of the present invention to provide a circular saw sharpener which has means through which the grinding wheel can be conveniently adjusted to the position best fitting the inclination of the teeth of the circular saw blade to be sharpened for efficient sharpening operation.

It is another object of the present invention to provide a circular saw sharpener which has a feed mechanism through which the circular saw blade to be sharpened can be conveniently moved by the hand to the correct grinding position for sharpening.

It is still another object of the present invention to provide a circular saw sharpener which has guide means to guide the circular saw blade to be sharpened to the grinding position for sharpening by a grinding wheel.

It is a yet further object of the present invention to provide a circular saw sharpener which is easy to maintain, convenient to operate, and inexpensive to manufacture.

DETAILED DESCRIPTION OF THE PREFERRED EMBODIMENT

Figure 1:
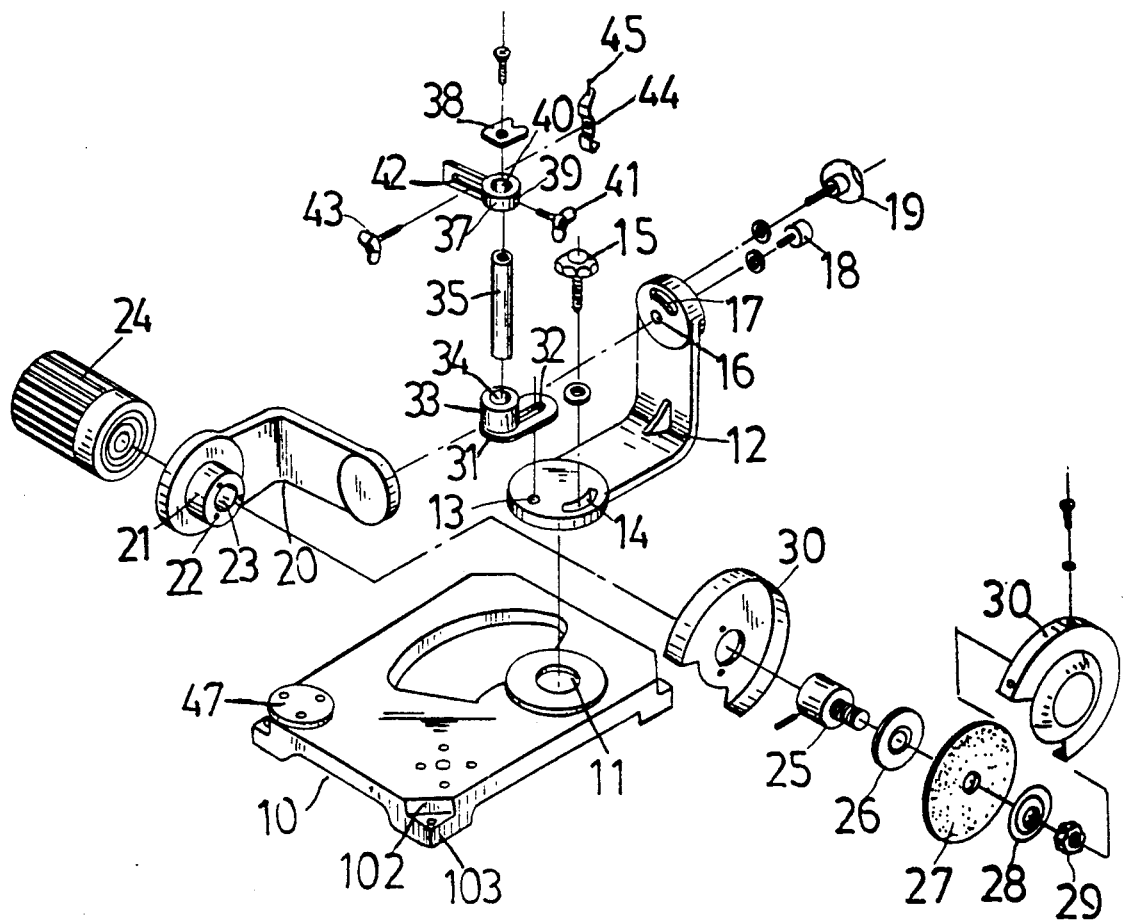
FIG. 1 is an exploded perspective view of the preferred embodiment of the present invention.

Referring to FIG. 1, therein illustrated is the preferred embodiment of the adjustable motor-operated circular saw sharpener of the present invention. As illustrated, there is provided a base 10 having a seat 11 on the top edge thereof at a suitable location for mounting a substantially L-shaped bracket 12 to which a motor 24 is secured by a substantially L-shaped frame 20. The bracket 12 has a bolt hole 13 and a curved slot 14 at one end, a bolt hole 16 and a curved slot 17 (namely, an upper bolt hole 16 and a curved upper slot 17 relative to the bolt hole 13 and the curved slot 14) at an opposite end. By fastening a lock screw 15 through the lower curved slot 14 into a hole on the seat 11, the bracket 12 is pivoted to the base 10 at the top. By means of controlling the lock screw 15, the angular position of the bracket 12 relative to the base 10 can be conveniently adjusted. By fastening a screw 18 and a lock screw 19 through the upper bolt hole 16 and the curved upper slot 17 into two bolt holes (not shown) on the L-shaped frame 20 at one end, the L-shaped frame 20 is pivoted to the bracket 12 at the opposite end thereof (relative to the base 10). The L-shaped frame 20 has a circular flange 21 at an opposite end at right angle which has a round hole 23 through the axis thereof and a plurality of bolt holes 22 on the end edge thereof around said round hole 23. The motor 24 is attached to the L-shaped frame 20 at the back relative to the circular flange 21. The output shaft 25 of the motor 24 is inserted through the round hole 23 and coupled with a cushion 26, a grinding wheel 27 and a washer 28 which are fastened in place by a lock nut 29. The grinding wheel 27 is covered in a protective cover 30 which is comprised of two symmetrical parts and fastened onto the bolt holes 22 on the circular flange 21. By controlling the lock screw 19 in the curved upper slot 17, the angular position of the L-shaped frame 20 relative to the bracket 12 is adjusted, and therefore, the grinding angle of the grinding wheel 27 is adjusted too.

There is a guide arrangement 105 mounted on the bracket 12 above the seat 11, which comprises a locating plate 31 having a slot 32 at one end secured to the lower bolt hole 13 on the bracket 12 by a screw (not shown) and a unitary stub tube 33 vertically disposed at an opposite end, which stub tube 33 has a round hole 34 at the center into which a rod 35 is fastened in place by a screw 36 (see FIG. 3) for holding a guide seat 37 and has a supporting plate 38 coupled thereto at the top. The guide seat 37 comprises a ring portion 39 at one end, which ring portion 39 has a round hole 40 at the center sleeved on the rod 35 and locked at any location on the peripheral surface of the rod by a lock screw 41, and an elongated slot 42 at an opposite end to which a guide member 44 is secured by a screw 43, which guide member 44 has a guide pin 45 vertically at one end. By controlling the lock screw 41, the position of the guide seat 37 on the rod 35 can be conveniently adjusted. By controlling the screw 43, the position of the guide member 44 on the elongated slot 42 of the guide 37 can also be adjusted. Further, by means of the control of the screw on the slot 32, the position of the locating plate 31 on the bracket 12 is adjusted, and therefore, the rod 35 can be moved to a suitable location relative to the grinding wheel 27.

Figure 2:
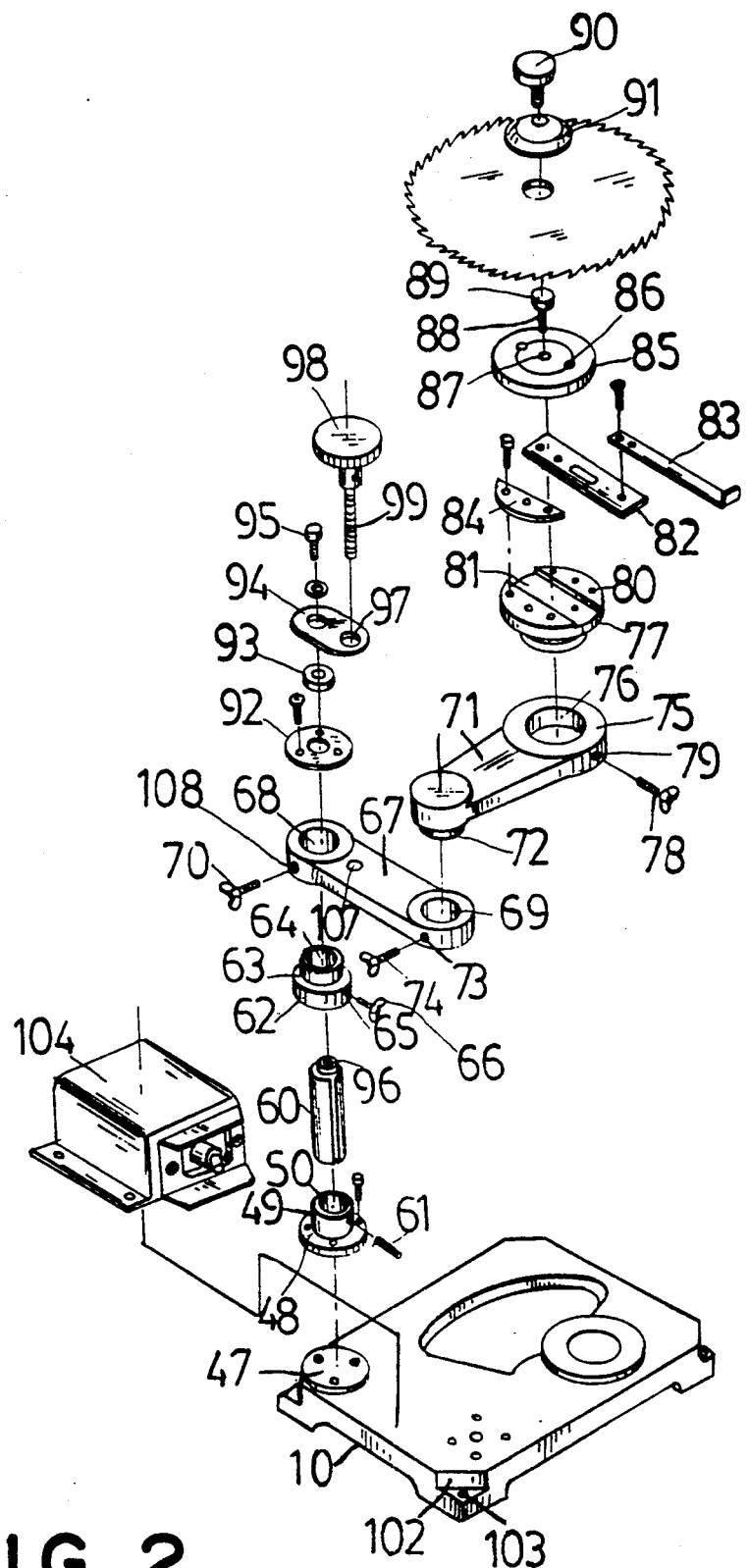
FIG. 2 is an exploded perspective view of the feed mechanism thereof.

Referring to FIG. 2, there is a feed mechanism 46 mounted on a raised portion 47 on the top edge of the base 10 at the front end thereof (relative to the bracket 12). The feed mechanism 46 comprises a bearer 48 mounted on the raised portion 47 of the base 10, which bearer 48 has a stub tube 49 at the top defining therein a round hole 50 for holding a shaft 60 by a pin 61, which shaft 60 is sleeved with a stepped bush 62. The stepped bush 52 comprised a unitary stub tube 63 at the top having a round hole 64 at the center and a bolt hole 65 on the peripheral surface thereof. By fastening a screw 66 through the bolt hole 65, the stepped bush 52 can be secured to the shaft 60 at the desired position. There is also provided a link 67 transversely mounted on the stepped bush 52. The link 67 has two round holes, namely, a first round hole 68 and a second round hole 69 on the top edge thereof at two opposite ends and two bolt holes, namely a first bolt hole 108 and a second bolt hole 73 on the peripheral surface thereof at two opposite ends respectively communicating with said two first and second round holes 68, 69. The stepped bush 62 is inserted in the first round hole 68 on the link 67 permitting the link 67 to be secured thereto by a screw 70 which is inserted through the first bolt hole 108. The second round hole 69 is provided for mounting a movable seat 71. The movable seat 71 has a circular projection 72 projecting from the bottom edge thereof at one end which is inserted in the second round hole 69 on the link 67 and secured in position by a screw 74 which is fastened in the second bolt hole 73, and a ring portion 75 at an opposite end which has a round hole 76 at the center for holding a rotary table 77 and a bolt hole 79 on the peripheral surface thereof for fastening a screw 70 to secure said rotary table 77 in place. The rotary table 77 has a plurality of bolt holes 80 on the top edge thereof and an elongated notch 81 at the middle for holding a rectangular plate 82. There is a hand lever 83 connected to the rectangular plate 82 at one end through which the rotary table 77 can be rotated on the movable seat 71. The rotary table 77 is attached with two opposite cushions 84 for holding a circular locating plate 85. The locating plate 85 has a plurality of bolt holes 86 on the top edge thereof through which it is secured to the cushions 84 above the rotary table 77 by screws (not shown), and another bolt hole 87 at the center into which a screw bolt 88 is fastened. The screw bolt 88 has a bolt hole on the top edge of the head 89 thereof. By fastening a screw 90 through a washer 91 into the bolt hole on the head 89 of the screw bolt 88, the circular saw blade to be sharpened is secured to the locating plate 85 for sharpening. Further, there is a washer 92, a rubber ring 93 and a connecting plate 94 respectively mounted on the first round hole 68 of the link 67 at the top in proper order and secured in place by a screw 95 which is fastened into a bolt hole 96 on the top edge of the shaft 60. The connecting plate 94 has a round hole 97 at an opposite end through which an adjusting knob 98 is fastened. The adjusting knob 98 has a unitary screw rod 99 at the bottom inserted into a bolt hole 107 on the link 67 for controlling the level position of the link 67 on the shaft 60. The base 10 further has four notches 102 on the top edge at the four corners thereof each of which has a round hole 103 for inserting a screw to secure the base 10 to a work table. There is also provided a power switch 104 mounted on the base 10 at a suitable location to control the operation of the motor 24.

Figure 3:
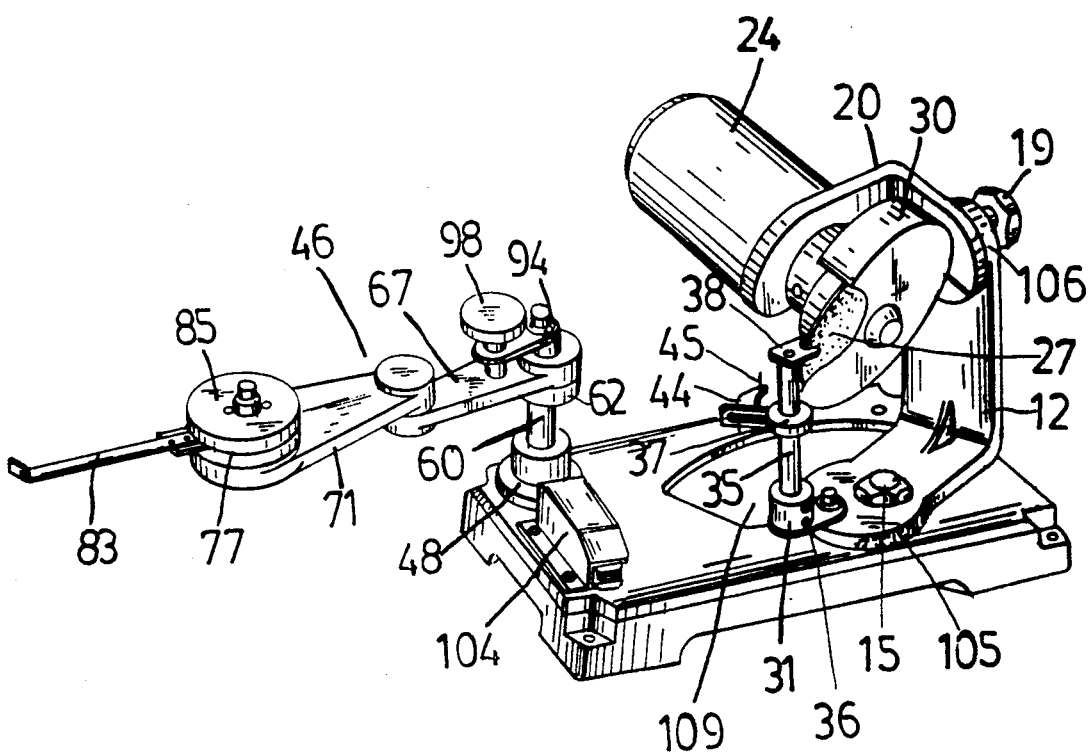
FIG. 3 is a perspective assembly view of the preferred embodiment of the present invention.
Figure 4:
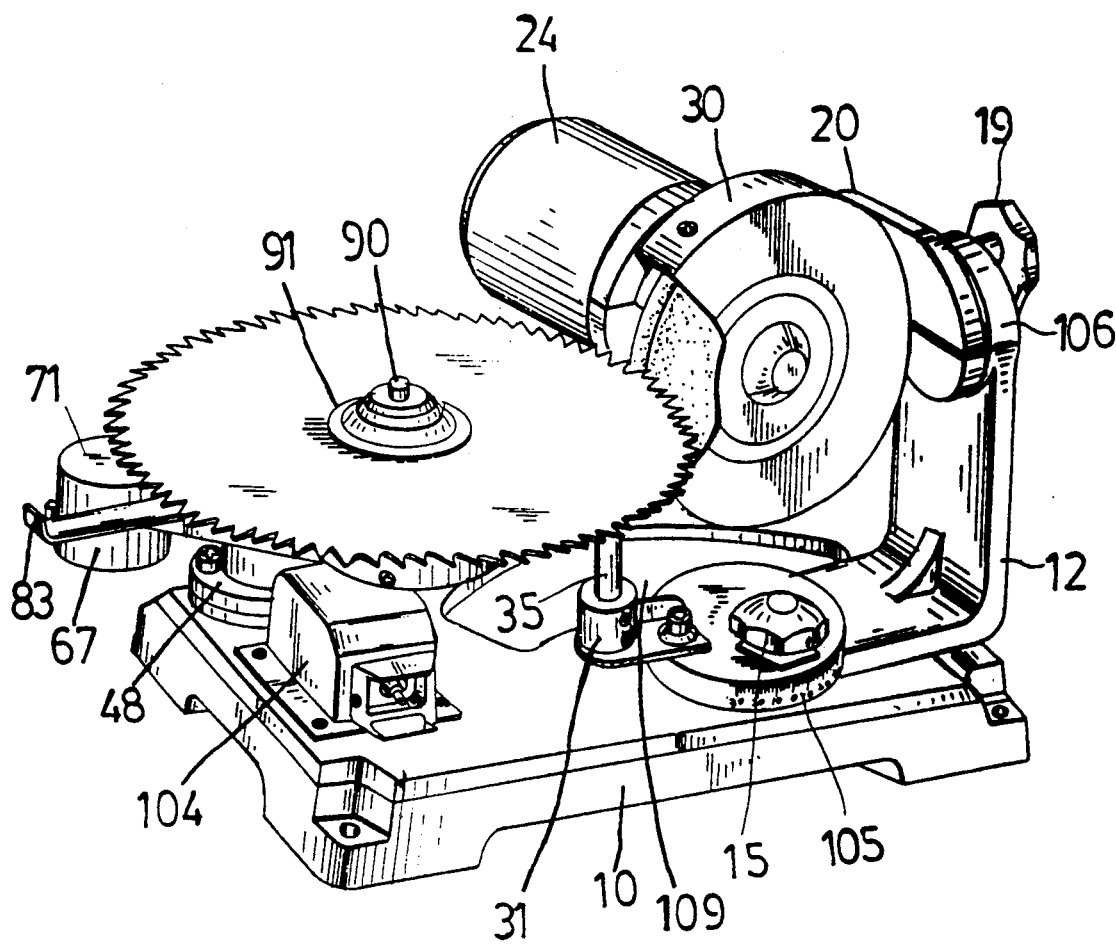
FIG. 4 illustrates the operation of the present invention in sharpening a circular saw blade.

The operation of the present invention is outlined hereinafter with reference to FIGS. 3 and 4. The bracket 12 has a first graduated scale 105 and a second graduated scale 106 made on the peripheral edge thereof adjacent to the curved slots 14, 17 respectively. By means of the indication of the graduated scales 105, 106, the bracket 12 and the L-shaped frame 20 can be properly adjusted to the desired angular positions respectively so that the grinding wheel 27 can best fit the inclination of the teeth of the circular saw blade to be sharpened. After the bracket 12 and a L-shaped frame 20 are properly set, the circular saw blade to be sharpened is fastened in the locating plate 85 by the screw 90 and the washer 91. Then, check all the connecting parts between the link 67 and the stepped bush 62; the movable seat 71 and the link 67; the rotary table 77 and the movable seat 71 to ensure flexible operation of the feed mechanism 48. At the same time, move the movable seat 71 through the hand lever 83 to carry the circular saw blade toward the peripheral edge of the grinding wheel 27 permitting the sand wheel 27 to be stopped by the guide pin 45. Then, adjust the link 67 and the movable seat 71 to the desired level by means of the control of the screw 66 and the adjusting knob 98 permitting the supporting plate 38 to be horizontally aligned with the circular saw blade to be sharpened. And then, adjusting the angular position of the locating plate 31 on the bracket 12 to move the rod 35 to a suitable position relative to the grinding wheel 27 so as to control the depth on the circular saw blade to be sharpened into which the grinding wheel 27 grinds. Therefore, the guide guide pin 45 can be received in the gap between the teeth on the circular saw blade to be sharpened to guide the circular saw blade to be sharpened for grinding accurately. Once all the aforesaid adjusting procedures are performed, the power switch 104 is switched on, and therefore, the grinding wheel 27 is carried to rotate by the motor 24. During the rotation of the grinding wheel 27, the guide pin 45 is moved along the periphery of the teeth on the circular saw blade so that the grinding wheel 27 grinds the teeth smoothly precisely. Once grinding process is completed, the power switch 104 is turned off to stop the operation of the motor 24 and the grinding wheel 27. By loosening the screw 90, the circular saw blade is removed from the locating plate 85.

I claim:
1. A circular saw blade sharpener, comprising:
  a base fastened in a work table;
  a L-shaped bracket mounted on said base at the top, said L-shaped bracket having a first bolt hole and a first curved slot at one end, a second bolt hole and a second curved slot at an opposite end, a first graduated scale on the peripheral edge thereof adjacent to said first curved slot, and a second graduated scale on the peripheral edge thereof adjacent to said second curved slot;
  a locating plate fastened in said first bolt hole on said L-shaped bracket and the angular position of which being controlled by a lock screw inserted through said first curved slot, said locating plate having
  a L-shaped frame fastened in said second bolt hole on said L-shaped bracket to hold a motor and a grinding wheel and the angular position of which being controlled by a lock screw inserted through said second curved slot, said grinding wheel being driven to rotate by said motor and protected by a protective cover;
  a guide arrangement mounted on said L-shaped bracket, said guide arrangement comprising a locating plate, said locating plate having a slot at one end adjustably secured to said first bolt by an adjusting screw and a unitary stub tube vertically disposed at an end of the locating plate with a rod fastened therein to hold a guide seat and a supporting plate, said guide seat comprising a ring portion at one end movably secured to said rod by a lock screw and an elongated slot at an opposite end, a guide member secured to the elongated slot on said guide seat by a screw, said guide member having two guide pins vertically aligned at one end;

a feed mechanism mounted on said base at the top in front of said guide arrangement, said feed mechanism comprising a bearer, a shaft vertically fastened in said bearer at the top by a pin, a stepped bush sleeved on said shaft and movably secured by a screw, a link transversely mounted on said stepped bush, said link having a first round hole pivoted to said stepped bush and secured in place by a screw and a second round hole at an opposite end, a movable seat having one end pivoted to the second round hole on said link and a round hole at an opposite end, a rotary table fastened in the round hole on said movable seat, a rectangular plate transversely fastened in a notch on said rotary table, a hand lever longitudinally connected to said rectangular plate for moving said rotary table, a locating plate fastened in said rotary table by a screw for holding the circular saw blade to be sharpened by a lock screw and a washer, a washer and a rubber ring and a connecting plate respectively mounted on said link above said stepped bush in proper order and secured in place by a screw fastened into a bolt hole on top of said shaft, said connecting plate having a round hole at an opposite end, and an adjusting knob having a screw rod at the bottom fastened through the round hole on said connecting plate into a bolt hole on said link to control the level position of said link on said shaft;

a power switch mounted on said base to control said motor to operate; and wherein said feed mechanism is moved by the hand through said hand lever to carry the circular saw blade mounted on said locating plate toward said guide member and said grinding wheel, when said power switch is switched on permitting the teeth on said circular saw blade to be guided by said guide pins and ground by said grinding wheel.

* * * * *